Figure 5:
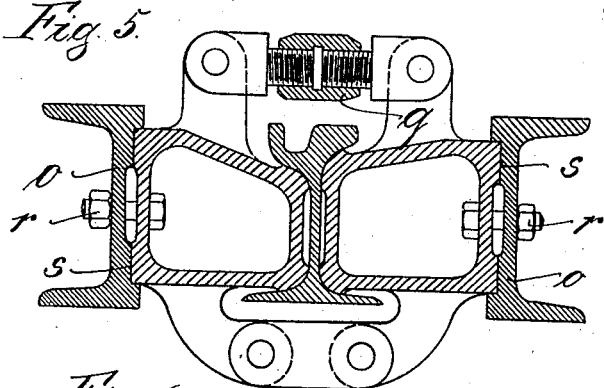

H. GOLDSCHMIDT & F. LANGE.
CLAMPING APPARATUS FOR CLAMPING AND BUTTING RAILWAY RAILS, &c., IN THE WELDING PROCESS.
APPLICATION FILED FEB. 15, 1907.
925,630.
Patented June 22, 1909.
3 SHEETS—SHEET 1.
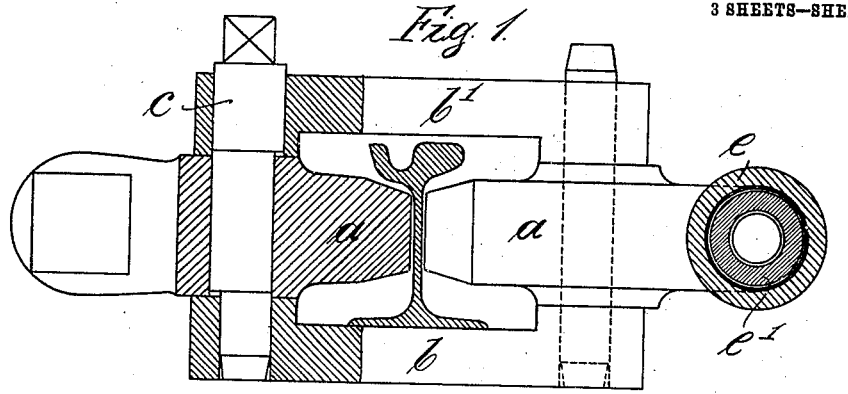
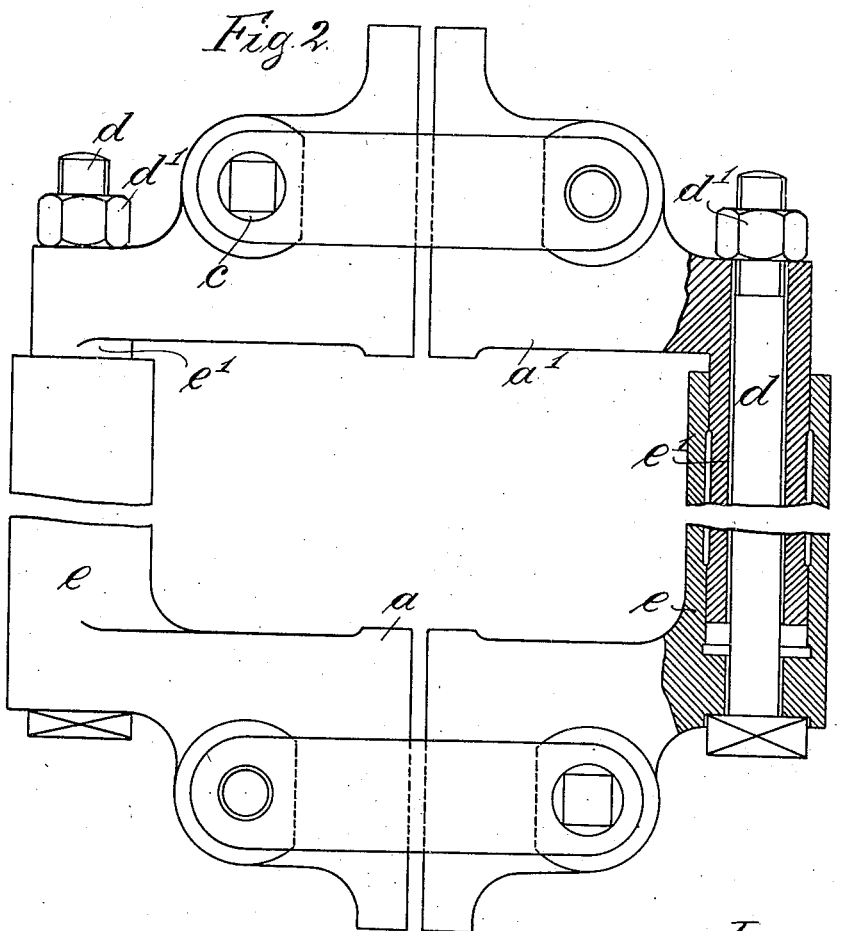
Witnesses:
Paul Wollenberg.
Emil Kayser.
Inventors,
Hans Goldschmidt
Felix Lange
by Rounsevipier
Attorney.

H. GOLDSCHMIDT & F. LANGE.
CLAMPING APPARATUS FOR CLAMPING AND BUTTING RAILWAY RAILS, &c., IN THE WELDING PROCESS.
APPLICATION FILED FEB. 15, 1907.
925,630.
Patented June 22, 1909.
3 SHEETS—SHEET 2.
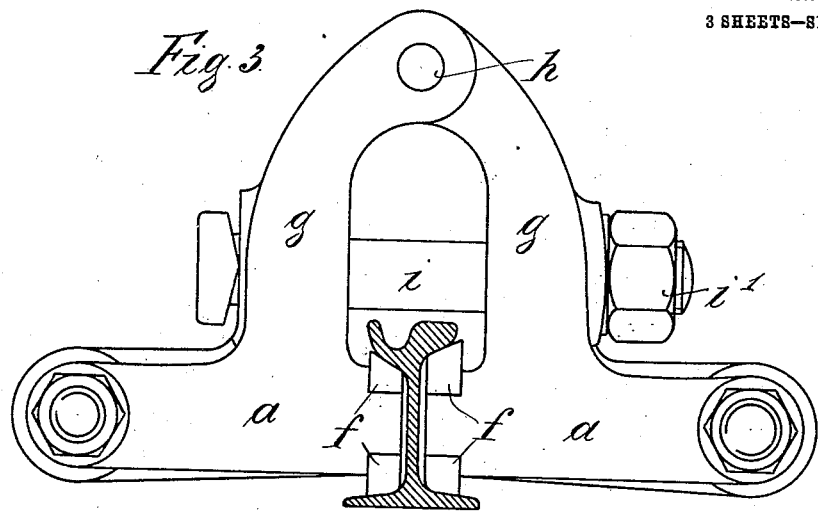
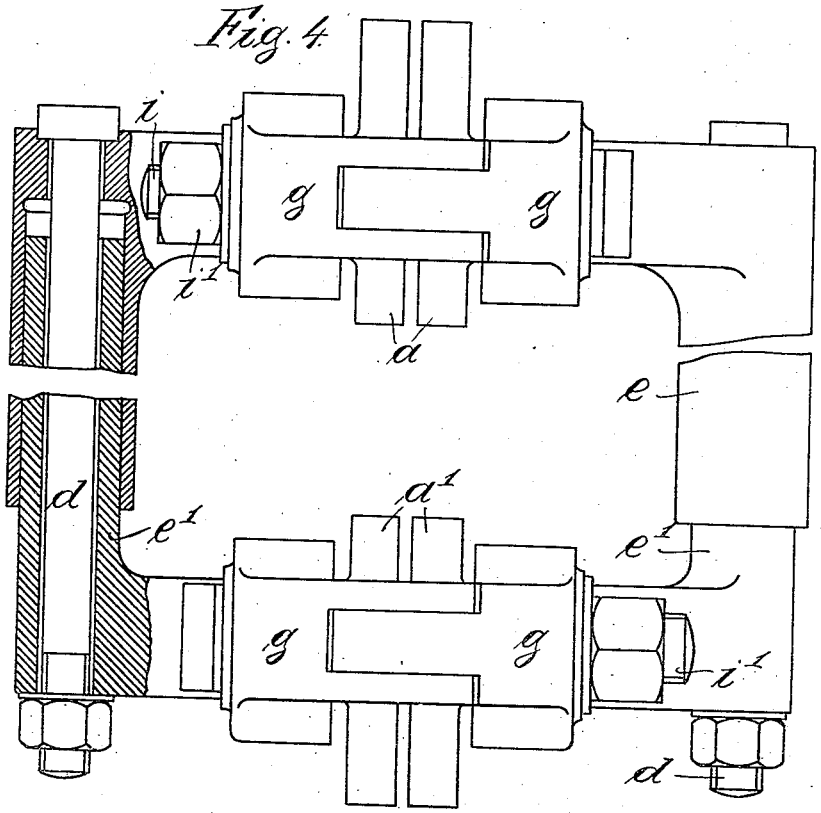

H. GOLDSCHMIDT & F. LANGE.
CLAMPING APPARATUS FOR CLAMPING AND BUTTING RAILWAY RAILS, &c., IN THE WELDING PROCESS.
APPLICATION FILED FEB. 15, 1907.

925,630.

Patented June 22, 1909.

3 SHEETS—SHEET 3.

Witnesses:
Paul Wollenberg.
Emil Kayser.

Inventors.
Hans Goldschmidt
Felix Lange
by Robert Keipler
Attorney

UNITED STATES PATENT OFFICE.

HANS GOLDSCHMIDT AND FELIX LANGE, OF ESSEN-ON-THE-RUHR, GERMANY, ASSIGNORS TO THE FIRM OF GOLDSCHMIDT THERMIT CO., OF NEW YORK, N. Y.

CLAMPING APPARATUS FOR CLAMPING AND BUTTING RAILWAY-RAILS, &c., IN THE WELDING PROCESS.

No. 925,630.  Specification of Letters Patent.  Patented June 22, 1909.

Application filed February 15, 1907. Serial No. 357,534.

*To all whom it may concern:*

Be it known that we, HANS GOLDSCHMIDT and FELIX LANGE, both subjects of the King of Prussia, German Emperor, and residents of Essen-on-the-Ruhr, German Empire, have jointly invented a new and useful Clamping Apparatus for Clamping and Butting Railway-Rails, Girders, and the Like in the Welding Process, of which the following is an exact specification.

This invention consists in a clamping apparatus for clamping and butting railway rails, girders and the like in the welding process, said apparatus especially perfecting the clamping apparatus heretofore used in the welding of iron rails and girders according to the Goldschmidt aluminothermic process. This known apparatus consists mainly of two pairs of clamps which are united by bridge bars and are by means of eccentric bolts pressed against the rails for the purpose of securing the clamps to the ends of the rails to be united by welding, and are by screw spindles or screw bolts brought together for the purpose of butting the rail ends in the welding process. Thousands of weldings have been done satisfactorily by means of such clamping apparatus, but they showed the defect of not automatically bringing the rail ends axially true against each other, for the workman had to be very careful lest the rails should cant or deviate from the straight line when the welding heat had been attained and the screw bolts were tightened up for butting the rails square against each other.

The object of this present invention is to obviate this defect and this is accomplished by firmly guiding the clamping pairs themselves or their means for tightening in a direction parallel with the rail axis and on opposite sides thereof. The guides may be cylindrical or prismatic.

The drawing shows several examples of carrying out the invention.

Figure 1 is a part sectional elevation, and Fig. 2 a top view partly in longitudinal section of a clamping apparatus with cylindrical guides. Fig. 3 is a part sectional elevation, and Fig. 4 a plan partly in longitudinal section of a clamping apparatus also with cylindrical guides but where the rail ends to be welded, because of the peculiar combination and formation of the clamps are guided accurately in all directions. Fig. 5 is a section, and Fig. 6 a plan of an apparatus with prismatic guiding of the clamps.

The new apparatus shown in Figs. 1 and 2 has like the apparatus hitherto used two pairs of clamps $a$ and $a'$, the clamps of each pair being connected by a lower bridge $b$ and an upper bridge $b'$ and having eccentric bolts $c$ for firmly clamping those clamps against the rail web, the two pairs of clamps being pulled toward each other by means of the screw bolts $d$ for butt welding the rails. Now according to this invention the pulling devices $d$ and thereby the pairs of clamps $a$ and $a'$ are guided parallel for which purpose the clamps $a'$ are provided with projecting tubular sockets $e'$ around the bolts $d$, and the clamps $a$ are provided with tubular sockets $e$ which surround the sockets $e'$. The tubular parts $e\ e'$ fit truly in each other, so as to compel the pairs of clamps to be guided parallel with the rail axis and so to prevent the pairs of clamps from deviating from the desired direction when the rail ends are pulled against each other for butt welding by means of the bolts $d$ and their nuts $d'$. In consequence of this exact guiding of the clamps it becomes unnecessary to provide a pulling device on each side as shown on the drawing, for it is enough to use a single spindle above the head of the rail, or under the rail base or at the side of the rail.

In the arrangement illustrated by Figs. 3 and 4 the clamps $a$ and $a'$ are also provided with tubular sockets $e$ and $e'$ which engage with each other and serve to receive the pulling screws $d$ in order to guide the rails exactly in the axial direction. But in order to guard not only against a lateral deviation of the rails but also against a bending in the vertical direction, or in order to produce an adjustment of the rails in a vertical direction at their place of butting, the clamps are provided with lash plates $f$ which fit the section of the rail, while at the same time the clamps in each pair are connected in another manner. The clamps are therefore pivotally jointed together by means of cast on arms or brackets $g$ and a pin $h$ and can by means of a nut $i'$ on a screw bolt $i$ which passes through the arms $g$, be pressed against the rails.

Figure 6:
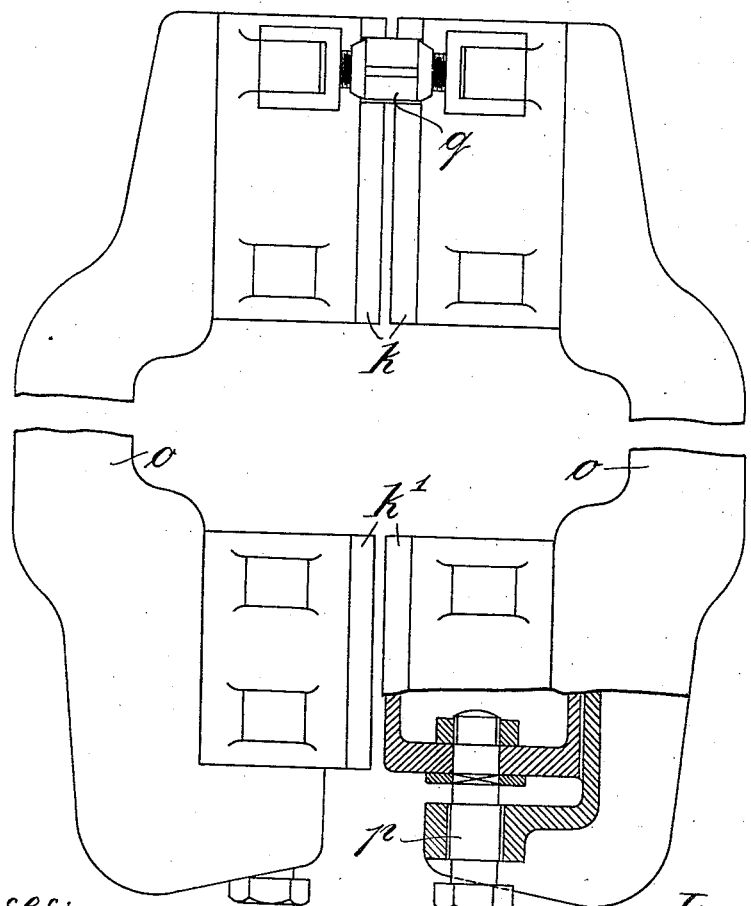

In stead of the described cylindrical socket guides for the pulling device guides separate from the latter but otherwise similar may of course be applied, and the screw bolts $b$ be arranged outside the guide and for instance made to slide in eyes on the clamps. Lastly, as shown in Figs. 5 and 6 the clamps may be made with prismatic guides. In this case the clamps $k$ and $k'$ are advantageously made of a section suiting the section of the rail and arranged in outer slide guides $s$ on bridge pieces $o$ parallel with the clamps and connected thereto by means of screws $r$ which work in oblong slots. The clamps of one pair may also as an example be permanently connected with the bridge pieces $o$, while the clamps $k'$ at the other end of the bridge $o$ are fitted to move in a longitudinal direction in order to effect a butting of the rail ends. The movable clamps are brought against each other by the pressing screws. The two clamps in each pair are pressed laterally against the clamped piece of rail by means of screw bolts with nuts or by nuts $q$ with right and left screw thread.

Clamping apparatus of the kind described is of course applicable not only for the so-called thermic welding but may just as successfully be applied where the welding heat is produced by electricity or by a blast with acetylene or oxy-hydrogen gas or in any other manner known. The butting action may also be produced in other ways than by means of screw bolts, or screw spindles viz: for instance by hydraulic means. More than two pairs of clamps may be connected with each other.

Having now particularly described the nature of our invention, what we desire to secure by Letters Patent of the United States is:—

A clamp for butt welding rail and like lengths, comprising sets of clamping jaws, guiding means extending axially between the sets of clamping jaws and on opposite sides of the lengths to be joined, the guiding means on one side of the axis coacting with those jaws of each pair which lie on the same side of the rail length as said guides, means for drawing the jaws of a pair toward one another so as to grip the rail or like lengths, and means for drawing the sets of clamping jaws axially toward one another along the guiding means, substantially as described.

In witness whereof we have hereunto set our hands in the presence of two witnesses.

HANS GOLDSCHMIDT.
FELIX LANGE.

Witnesses:
ALFRED POHLMEYER,
M. ENGELS.